Feb. 12, 1957     A. J. DE ROSSET     2,781,299
HYDROCARBON CONVERSION PROCESS
Filed July 19, 1954
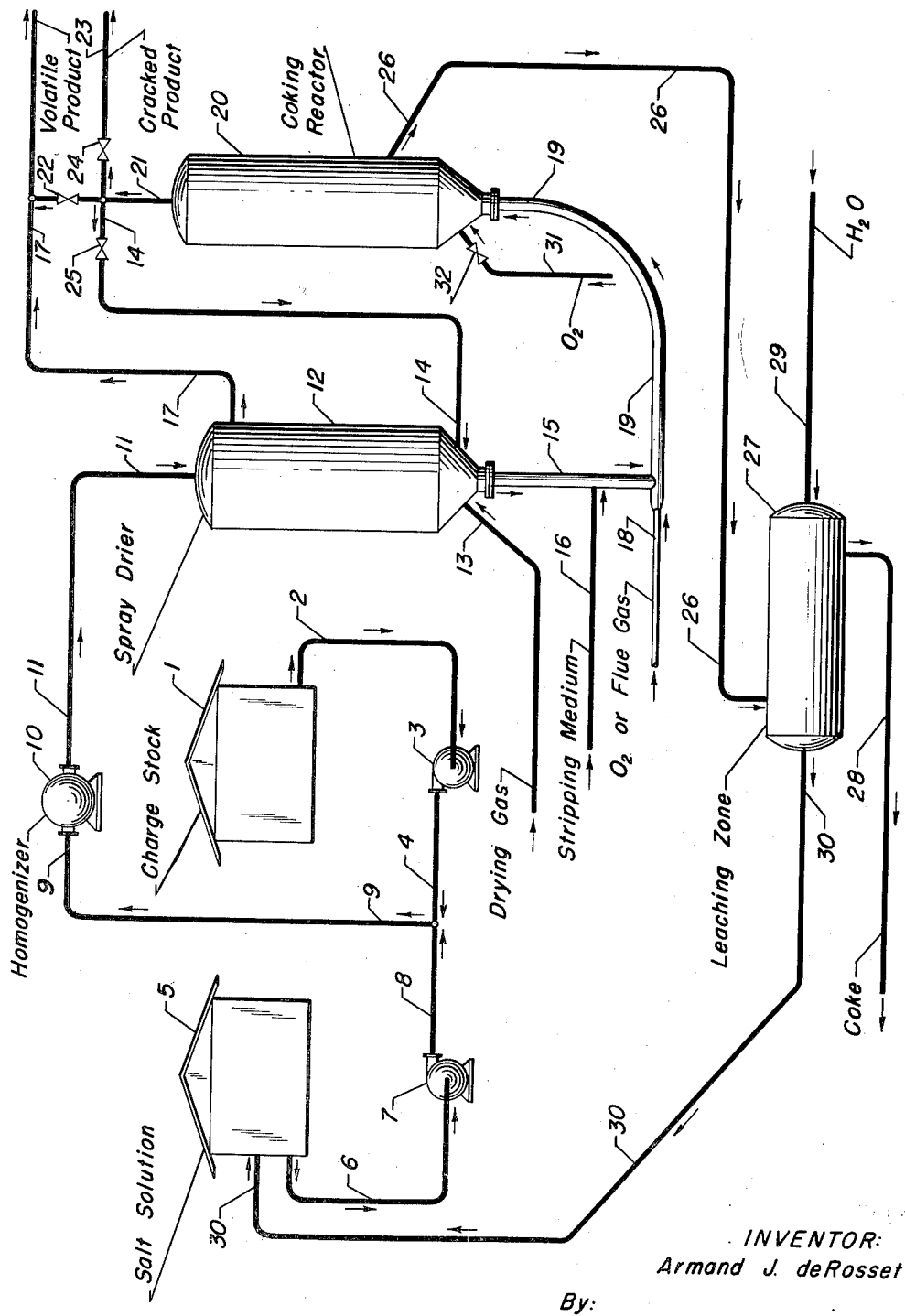
INVENTOR:
Armand J. deRosset
By:
Chester J. Giuliani
Philip T. Liggett
ATTORNEYS:

United States Patent Office 2,781,299
Patented Feb. 12, 1957

2,781,299

HYDROCARBON CONVERSION PROCESS

Armand J. De Rosset, Clarendon Hills, Ill., assignor to Universal Oil Products Company, Des Plaines, Ill., a corporation of Delaware Application July 19, 1954, Serial No. 444,307

9 Claims. (Cl. 196—52)

This invention relates to a method of coking heavy oils and in particular to a process for coking oils occluded on fluidized particles.

In one embodiment this invention relates to a process for coking heavy oil which comprises emulsifying said heavy oil with an aqueous solution of a stable salt which is unreactive with said heavy oil, spray drying the resultant emulsion to form a volatile product and fluidizable particles, suspending said fluidizable particles in an ascending gas stream at coking conditions to produce vaporous cracked product and a salt-coke composite, passing said salt-coke composite to a leaching zone wherein it is contacted with water, separating a resultant salt solution and passing the latter into contact with heavy oil as the aforesaid aqueous solution.

Briefly, the present invention provides a process for coking a heavy oil in a manner to prevent the coke from caking on the equipment by providing a substance upon which the coke may form, which substance is water soluble so that it may be removed from the solid particles of coke after their formation has been completed. The use of an emulsion of heavy oil with a salt solution has many advantages. Particularly with extremely heavy oils where it is difficult to cause flowing, an emulsion of oil and water, particularly oil in water emulsions, cause the heavy oil to be in a highly mobile state which may be pumped readily even at low temperatures with conventional equipment. Another advantage to converting an emulsion of the heavy oil is that the spray drying step in the process provides a ready means of steam stripping the more volatile components of the charge stock. This advantage will be discussed in greater detail hereinafter. The emulsion when spray dried becomes a suspension of salt particles with oil occluded thereon and this suspension is in the form of small particles which may be readily fluidized with the inherent advantages of fluidized solids. By causing the conversion to be effected in the fluidized state, the coking occurs on the surfaces of the fluidized particles and thereby prevents or at least substantially reduces the amount of coke formed on the walls of the equipment and the interior surfaces of the process lines.

Besides the above enumerated advantages the process of the present invention is readily adapted to processes being automatically effected. When the salt maintained in the solution is catalytic in nature the process will be effected with greater selectivity to obtain more favorable product distribution and the catalytic salt may be recovered in the leaching step with no requirement for regeneration and no loss of activity.

As hereinbefore stated the charge stock of the present process may be any convertible organic compound particularly petroleum derivatives and more particularly heavy oils. This process is especially adapted and suitable for converting an extremely heavy material such as reduced crude, cracked residuum, etc. which material is very difficult to convert in more conventional processes and represents a relatively unmarketable fraction of a crude oil to a refiner.

The emulsion used in the present invention will be in salt solution so that when it is evaporated there will remain a solid particle upon which the oil may be occluded. The emulsion may also contain a small amount of a suitable surface active agent to stabilize it. The salts used may or may not be catalytic in nature, however, they must have the characteristics of being water soluble, stable at high temperatures, not readily vaporized or liquefied at high temperatures and inert with respect to the charge stock. By inert it is not meant that the salt should have no catalytic activity, it is simply meant that the salt will not form compounds or complexes to any great extent with the charge stock which would cause the salt to form a product which would be lost in the subsequent stages of the process. The salts which may be used include such substances as the halides of alkali or alkaline earth metals and may also include halides of catalytic metals such as tin, zinc, etc.

The emulsion of oil and aqueous solution of, for example, calcium chloride, according to the process of this invention, is spray dried to form fluidizable particles of salt and oil and a volatile product. The spray drying is preferably effected in an elongated, cylindrical vessel fitted in the upper portion thereof with a spray head which is adapted to cause the liquid emulsion stream to be broken up into fine liquid particles. The particles discharging from the spray head descend through the elongated cylindrical dryer and are heated to cause the aqueous portion of the droplet to vaporize and leave a solid particle of salt upon which the unvaporizable oil is occluded. The vaporization of the water from the droplet of emulsion may be effected by indirect heat exchange or preferably by being contacted with an ascending stream of hot gaseous material which is introduced into the lower portion of the spray dryer. This material may be inert gas such as flue gas, superheated steam or high temperature product from the subsequent coking step. The spray dryer must of course be operated at a temperature in excess of the boiling point of the calcium chloride solution and will preferably be operated at a temperature of from about 200° F. to about 800° F. and at low pressure to facilitate the vaporization of liquid.

The fluidizable particles produced in the spray dryer are suspended in a gas stream, preferably air, and conveyed to the coking zone wherein they are maintained in a fluidized bed at coking conditions until the oil contained thereon is converted into hard, dry solid coke and cracked product. A fluidized bed of particles is maintained at a temperature of from about 750° F. to about 1500° F. and at any suitable pressure for sufficient time for the cracking-coking reactions to be effected and this temperature may be maintained by maintaining the bed in a fluidized state with a hot flue gas or autothermically maintained by introducing oxygen, either extraneously or as a portion of the carrying and fluidizing gas, into the coking zone so that the heat required for the coking reactions is obtained from the oxidation of a portion of the oil in the zone.

The salt-coke particles resulting from the reaction in the coking zone are discharged therefrom and passed into a leaching zone wherein they are contacted with a stream of water to dissolve the salt from the particles thereby forming a salt solution and salt-free coke particles. The leaching zone may be a simple single stage contacting zone but is preferably a countercurrent contacting process such as a Dorr thickener. The leaching operation may be effected in a stage-wise countercurrent manner or in a continuous countercurrent manner to obtain more desirable results and a more saturated salt solution resulting. The salt solution that is removed from the leaching zone may be returned into contact with the charge stock to be emulsified therewith to repeat the cycle hereinbefore described. The coke particles may be ground prior to leaching to improve the contact.

The cracked product and the volatile product are both vaporizable hydrocarbons and may be combined into a single product stream resulting from this process. This combination may be effected external to both the spray drying zone and the coking zone or it may be effected by using at least a portion of the cracked product as at least a portion of the vaporizing gas used in the spray dryer to remove water. The vaporous material removed from the spray dryer will be cooled and passed into a separation zone wherein a water phase and a hydrocarbon phase will separate. This water phase will be preferably used as at least a portion of the water used in the leaching zone so that the amount of treating required to purify this water will be diminished. The cracked product will require fractionation and a portion thereof may be returned to the original charge stock to be again subjected to the cracking treatment in case conversion was not effected in the first pass.

The process of the present invention may be best described with reference to the accompanying drawing which illustrates one embodiment of this invention but which is intended to describe rather than limit the invention to the particular embodiment herein illustrated.

Referring now to the drawing, charge stock such as a reduced crude in tank 1 is passed via line 2 and pump 3 into line 4 wherein it is commingled with aqueous salt solution passing from tank 5 and line 6, through pump 7 and line 8. The aqueous salt solution from line 8 and the charge stock from line 4 are commingled in line 9 and passed into a homogenizer 10 wherein they are intimately contacted to form a stable or semi-stable emulsion. The homogenizer may be any of the conventional types, such as those with rotating discs that rotate in opposite directions to form extreme turbulence therebetween, or any other suitable type.

The homogenized mixture or emulsion of oil and water passes from homogenizer 10 through line 11 into the upper portion of spray dryer 12 wherein it is dispersed by means of a spray head not shown. The dispersed emulsion in spray dryer 12 is contacted, in this embodiment, with an ascending stream of hot gas which may be flue gas, steam, other inert gas, cracked product from the subsequent coking step or any combinations of these, entering spray dryer 12 through line 13 and/or line 14 and the result of such countercurrent contact of emulsion particles and hot gas produces a stream of volatile product which contains water vapor and whatever volatile fraction of the oil that is steam distilled by such contact. The volatile products pass from the upper portion of spray dryer 12 through line 17 to be further treated. A resulting stream of salt particles upon which oil is occluded passes from the lower portion of spray dryer 12 through line 15 and is contacted with a stripping medium therein which enters an intermediate portion of line 15 through line 16 and which further removes vaporizable material from the particles. The spray dried and steam stripped particles pass into line 19 wherein they are commingled with a transporting gas stream from line 18 which carries the particles as a suspension through line 19 and into the lower portion of coking reactor 20. The transporting gas medium in this embodiment may be an inert gas, a heating gas or a reactant and may include such material as flue gas, steam, nitrogen, oxygen-containing gas such as air, or air enriched in oxygen, etc. When the process is to be effected autothermically the carrying gas from line 18 preferably contains oxygen, however, it may be an inert gas such as hot flue gas and the oxygen for autothermic reaction may be obtained by passing air through line 31, containing valve 32, which connects with the lower portion of coking reactor 20.

In coking reactor 20 the cracking-coking reactions occur and result in a cracked product comprising hydrocarbons lighter than the charge stock which pass through a suitable particle separator not here shown, from the upper portion of coking reactor 20 through line 21 and valve 22 which intersects the beforementioned line 17 to commingle the cracked product with the volatile product from the previous spray drying zone. When it is desired to have separate products from the spray drying zone and the coking zone, valve 22 may be closed and valve 24 opened so that the cracked product resulting from coking reactor 20 will pass through line 23 to whatever further processing is required. When desired valve 25 may be opened to cause at least a portion of the cracked product to pass through the beforementioned line 14 into the lower portion of spray dryer 12 to act as a heating medium for the vaporization of water from the descending dispersed emulsion.

As hereinbefore stated the reactions in the coking reactor result in the formation of hard, solid dry particles of coke which contain occluded therein the salt from the emulsion. These particles are removed from coking reactor 20 and passed through line 26 into leaching zone 27 wherein they are contacted with a stream of water entering leaching zone 27 through line 29. As a result of this contact there is obtained a stream of substantially salt-free coke particles discharging from the lower portion of leaching zone 27 through line 28 and a salt solution which passes from leaching zone 27 through line 30. Line 30 preferably passes to storage tank 5 wherein salt solution is stored prior to being commingled with the incoming charge stock.

There may of course be many modifications of the present invention without removing the modified process from the broad scope of this invention. Many valves, pumps, instruments, and other processing aids may be used to effect control of temperatures, pressures, flow rates, etc. in various portions of the process. The disposition of the product from the process may also be adjusted so that a portion thereof, as for example recycle streams, are in heat exchange with various processing streams so that the overall process is more thermally efficient.

It may be seen from the foregoing that the process of the present invention provides a means of converting a heretofore difficultly convertible material to produce valuable light products therefrom and to recover a solid combustible fuel.

I claim as my invention:

1. A process for coking a heavy oil which comprises emulsifying said heavy oil with an aqueous solution of a stable metal salt which is unreactive with said heavy oil, spray drying the resultant emulsion to form a volatile product and fluidizable particles of metal salt carrying occluded unvaporized oil, suspending said fluidizable particles in an ascending gas stream and subjecting the same to coking conditions while in fluidized state to produce vaporous cracked product and a salt-coke composite.

2. The process of claim 1 further characterized in that said salt-coke composite is passed to a leaching zone wherein it is contacted with water and a salt solution is recovered which is passed into contact with the incoming heavy oil as the aforesaid aqueous solution.

3. A process for coking heavy oil which comprises emulsifying said heavy oil with an aqueous solution of a stable metal salt which is unreactive with said heavy oil, passing the resulting emulsion as fine droplets into a spray drying zone maintained at a temperature of from about 200° F. to about 800° F. wherein said droplets descend countercurrent to a stream of hot gas to produce hydrocarbon vapors and fluidizable particles of metal salt carrying occluded unvaporized oil, suspending said fluidizable particles in an ascending gas stream and subjecting the same to a temperature of from about 750° F. to about 1500° F. while in fluidized state to produce cracked vapors and a salt-coke composite, leaching said salt-coke composite with water to form a salt solution and passing the later into contact with heavy oil as the aforesaid aqueous solution.

4. The process of claim 3 further characterized in that said stream of hot gas comprises at least a portion of said cracked vapors.

5. The process of claim 3 further characterized in that said ascending gas stream contains free oxygen.

6. A process for producing coke which comprises emulsifying heavy hydrocarbon oil with an aqueous solution of a water-soluble, stable, metal salt which is unreactive with said oil, spray drying the resultant emulsion to form metal salt particles carrying occluded unvaporized oil, fluidizing said particles and subjecting the same to coking conditions while in fluidized state, thereby forming composite salt-coke particles, and leaching the last-mentioned particles with water to dissolve and separate the salt from the coke.

7. The process of claim 6 further characterized in that said metal salt is a halide.

8. The process of claim 6 further characterized in that said metal salt is calcium chloride.

9. The process of claim 6 further characterized in that the water containing dissolved salt from the leaching step is supplied to the emulsifying step as said aqueous solution.

References Cited in the file of this patent

UNITED STATES PATENTS

| | | |
|---|---|---|
| 1,528,327 | Hancock | Mar. 3, 1925 |
| 2,288,395 | Ellis | June 30, 1942 |
| 2,445,328 | Keith | July 20, 1948 |
| 2,490,975 | Mathy | Dec. 13, 1949 |